July 18, 1950  H. H. CHISWIK  2,515,631
APPARATUS FOR THE PRODUCTION OF STEEL
Filed March 19, 1948  2 Sheets-Sheet 1

INVENTOR
HAIM H. CHISWIK
BY
ATTORNEYS

July 18, 1950 H. H. CHISWIK 2,515,631
APPARATUS FOR THE PRODUCTION OF STEEL
Filed March 19, 1948 2 Sheets-Sheet 2

INVENTOR
HAIM H. CHISWIK
BY
ATTORNEYS

Patented July 18, 1950

2,515,631

UNITED STATES PATENT OFFICE 2,515,631

APPARATUS FOR THE PRODUCTION OF STEEL

Haim H. Chiswik, East Orange, N. J., assignor to Air Reduction Company, Incorporated, New York, N. Y., a corporation of New York Application March 19, 1948, Serial No. 15,807

1 Claim. (Cl. 266—34)

This invention relates to the production of steel and particularly to improvements relating to the use of oxygen to reduce the carbon content of the steel.

It is already known that oxygen may be utilized advantageously to reduce rapidly the carbon content of steel in a molten bath. One way of effecting this result is the introduction of a pipe or lance beneath the surface of the steel while oxygen under pressure is supplied through the pipe. Considerable arduous labor under adverse temperature conditions is involved in holding and directing the pipe so as to achieve the desired result.

It is the object of the present invention to provide apparatus permitting the manipulation of means for supplying oxygen to a metallurgical furnace and of avoiding difficulties heretofore encountered in such operations.

Other objects and advantages of the invention will be apparent as it is better understood by reference to the following specification and accompanying drawing, in which Fig. 1 is a side elevation of a furnace embodying the invention with parts thereof in section;

Figure 1:
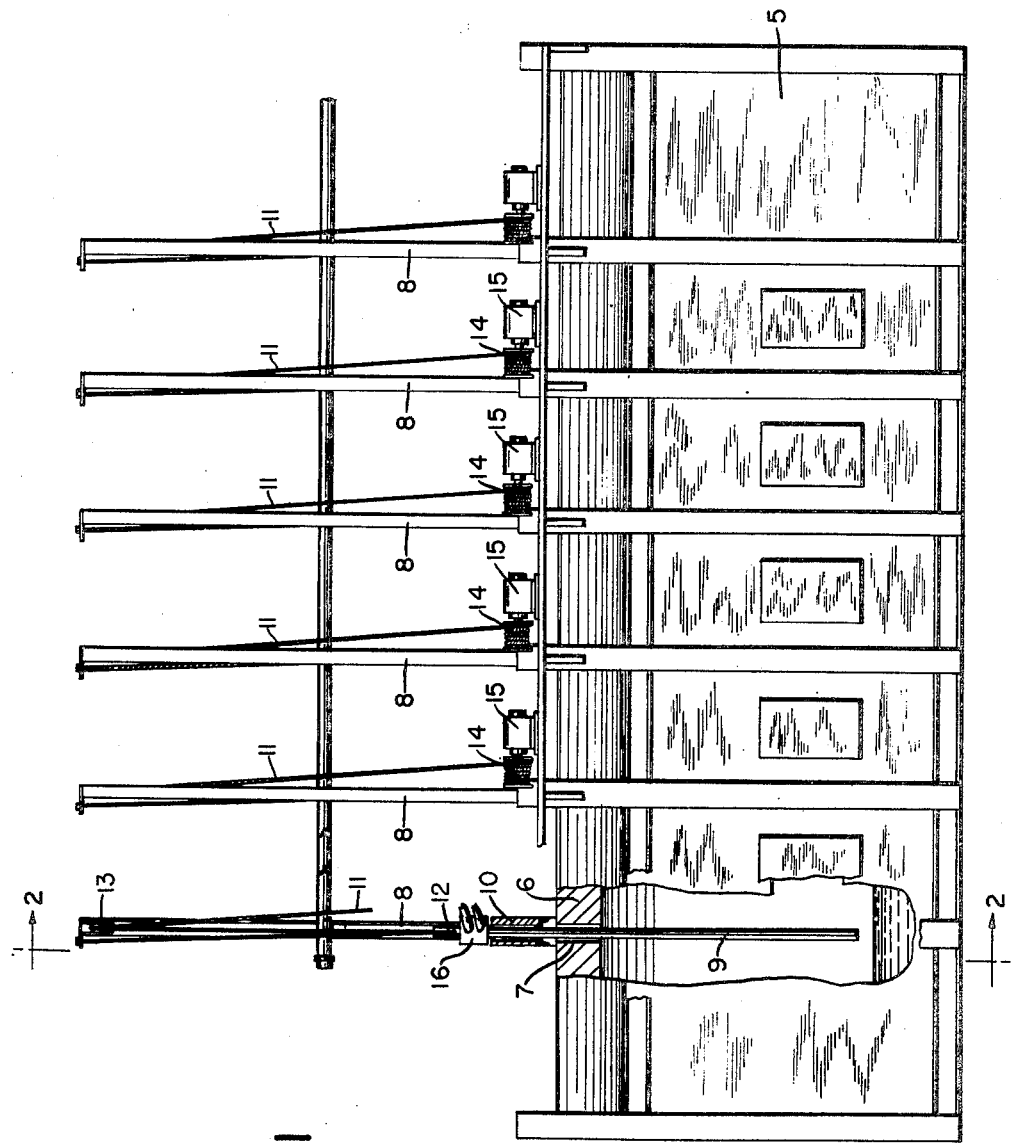
Figure 3:
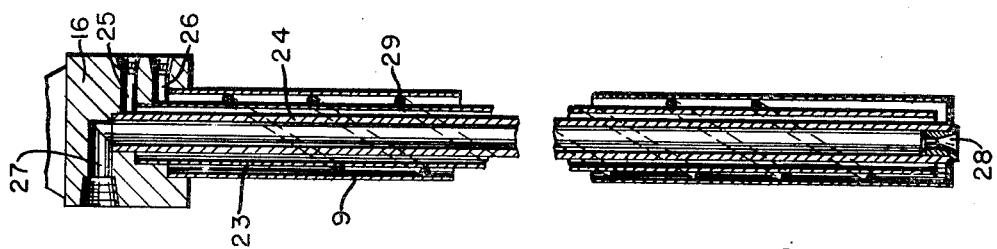
Fig. 3 is a detail in section showing one of the pipes through which oxygen is introduced to the furnace.
Figure 2:
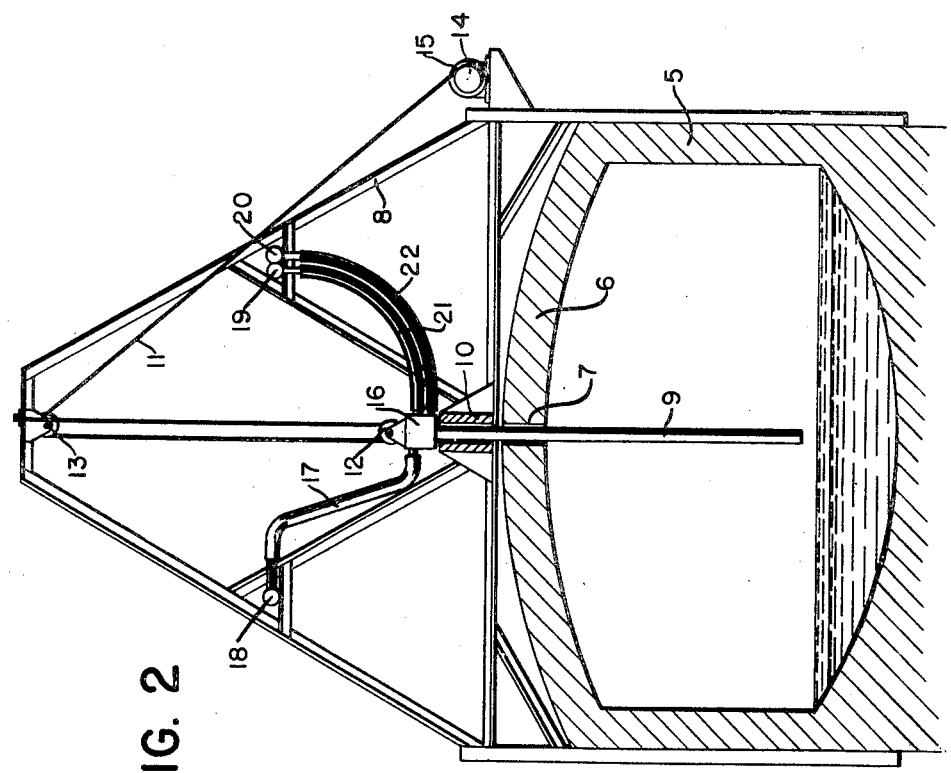
Fig. 2 is a section on the line 2—2 of Fig. 1.

While the invention is described more particularly in connection with an open hearth furnace, it is applicable to other types of metallurgical furnaces including electrically heated furnaces.

Referring to the drawing, 5 indicates an open hearth furnace of usual construction. It will be understood that the furnace is provided with the customary means for supplying fuel and combustion air to maintain the desired temperature within the furnace during the melting and refining operations.

The furnace has a roof 6 provided with a plurality of spaced openings 7. Upon the roof of the furnace, in proper alignment with the openings 7, a plurality of trusses 8 are mounted to sustain the weight of the apparatus hereinafter described.

A plurality of pipes or injection nozzles 9 depend through the openings 7 and guideways 10 which maintain the pipes in proper alignment. Cables 11 are secured at the top of the trusses 8, pass over pulleys 12 and 13 and are connected to winches 14 which may be actuated by electrical motors 15 or other means for winding the cables. The motors may be controlled by switches (not shown) so that they may be actuated individually to raise or lower the corresponding pipes 9.

At the top of each of the pipes 9, a header 16 is provided with suitable passages therein. A flexible connection or conduit 17 from a manifold 18 delivers oxygen under suitable pressure to the pipe 9 which introduces the oxygen into the interior of the furnace and, if desired, directly into the molten metal. Manifolds 19 and 20 are provided to supply and withdraw cooling water for the purpose of maintaining the proper temperature of the pipe 9 and are connected to inlet 25 and outlet 26 by flexible conduits 21 and 22. The pipe 9 preferably encloses pipes 23 and 24, forming passages through which the water circulates. Thus, water introduced through the inlet 25 passes between the pipes 23 and 24 to the bottom and returns to the passage 26 and thence to the manifold 20. The oxygen introduced through the passage 27 enters the pipe 24 and is delivered therefrom by a nozzle 28 at the lower end of the pipe 9. Baffles 29 may be provided in the space between the pipes 9 and 23 to ensure more effective cooling by providing turbulence in the water flow.

An important feature of the apparatus as described is that the position of each of the pipes 9 can be individually controlled. This permits the oxygen to be introduced at the point or points in the furnace where it is most needed. Also, each of the pipes 9 can be used individually to assist in the melting of floating scrap. The distance between the nozzle 26 of each of the pipes 9 and the surface of the bath can be accurately controlled, thereby eliminating the danger of excessive splashing of the metal and the accompanying deterioration of the furnace refractory.

The apparatus as described materially facilitates the utilization of oxygen in a metallurgical furnace. The oxygen used may be commercially pure oxygen, i. e. 99.5% oxygen. The apparatus is particularly effective in the elimination of carbon from molten steel during the latter portion of the refining operation. It may, however, be used for other purposes in connection with the refining of steel in an open hearth furnace and in other types of metallurgical furnaces where similar problems arise.

Various changes may be made in the form and arrangement of the apparatus without departing from the invention or sacrificing the advantages thereof.

I claim:

In a metallurgical apparatus for treating steel, the combination of a metallurgical furnace having a roof with spaced openings therein, supporting means supported by the furnace and above the roof thereof, an oxygen manifold supported by the supporting means and extending longitudinally of the furnace, a pair of water manifolds supported by the supporting means and extending longitudinally of the furnace, an injection nozzle extending through each of the openings in the roof and movable vertically therethrough, each nozzle having an inner passage extending therethrough for the passage of oxygen and a surrounding water jacket, flexible conduits connecting the inner oxygen passages of the respective nozzles with the oxygen manifold, a pair of flexible water conduits connected to the water jacket of each nozzle, one of the flexible water conduits connected to each nozzle being connected to one of the water manifolds for supplying cooling water to the water jacket of the nozzle to which it is connected and the other flexible conduit connected to each nozzle being connected to the other water manifold for the passage of water which has passed through the water jacket of such nozzle to said other water manifold, and means at least in part supported by said supporting means for raising and lowering the respective nozzles to adjust their discharge ends relative to the surface of molten metal in the furnace.

HAIM H. CHISWIK.

REFERENCES CITED

The following references are of record in the file of this patent:

UNITED STATES PATENTS

| Number | Name | Date |
|---|---|---|
| 725,786 | Smethurst | Apr. 21, 1903 |
| 1,193,783 | Hillhouse | Aug. 8, 1916 |
| 1,475,365 | Schueler et al. | Nov. 27, 1923 |
| 1,715,155 | Westberg | May 28, 1929 |
| 1,774,486 | Kekich | Aug. 26, 1930 |
| 1,812,563 | Simpson | June 30, 1931 |
| 2,039,087 | Kinzel | Apr. 28, 1936 |
| 2,446,511 | Kerry et al. | Aug. 3, 1948 |

FOREIGN PATENTS

| Number | Country | Date |
|---|---|---|
| 1,077 | Great Britain | 1879 |